(12) United States Patent
Hayashi

(10) Patent No.: US 8,351,709 B2
(45) Date of Patent: Jan. 8, 2013

(54) PROJECTION HEIGHT MEASURING METHOD, PROJECTION HEIGHT MEASURING APPARATUS AND PROGRAM

(75) Inventor: Kenta Hayashi, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 823 days.

(21) Appl. No.: 12/440,664

(22) PCT Filed: Sep. 7, 2007

(86) PCT No.: PCT/JP2007/067494
§ 371 (c)(1),
(2), (4) Date: Mar. 10, 2009

(87) PCT Pub. No.: WO2008/032651
PCT Pub. Date: Mar. 20, 2008

(65) Prior Publication Data
US 2010/0040258 A1    Feb. 18, 2010

(30) Foreign Application Priority Data
Sep. 12, 2006   (JP) .................................. 2006-247276

(51) Int. Cl.
*G06K 9/46*   (2006.01)

(52) U.S. Cl. ........................................................ 382/203
(58) Field of Classification Search .................. None
See application file for complete search history.

(56) References Cited

U.S. PATENT DOCUMENTS
2005/0129304 A1   6/2005   Sasazawa et al.

FOREIGN PATENT DOCUMENTS
| JP | 2005-061953 A | 3/2005 |
| JP | 2005-121508 A | 5/2005 |
| JP | 2005-181092 A | 7/2005 |

*Primary Examiner* — Chan S Park
*Assistant Examiner* — Elisa Rice
(74) *Attorney, Agent, or Firm* — Sughrue Mion, PLLC

(57) ABSTRACT

A projection height measuring method measures the height of a projection having a conical shape, formed on the surface of a workpiece. The area having the projection is imaged at an angle of depression. A projection area is extracted by classifying an area in the image into a bright area, a dark area and an intermediate area. From these, an area composed of the bright area and the dark area indicates the projection area, and the intermediate area indicates the work area. The length of the bottom surface diameter the length of a generatrix of the projection area are determined. The height of the projection is calculated based on the two lengths and the angle of depression.

9 Claims, 6 Drawing Sheets

(a)

(b)

PROJECTION HEIGHT MEASURING METHOD, PROJECTION HEIGHT MEASURING APPARATUS AND PROGRAM

TECHNICAL FIELD

The present invention relates to a projection height measuring method and a project height measuring apparatus, and further in detail, this relates to the projection height measuring method and the projection height measuring apparatus for measuring a height of a projection such as a bump or the like formed on a surface of a workpiece such as a circuit board and an LSI chip, with high accuracy.

BACKGROUND ART

On the circuit board and the LSI chip such as a ball grid array (BGA), a number of projections such as minute bumps are provided so as to be used as electrodes for wiring. To measure the height of the projection formed on the surface of a certain workpiece in this manner is important when confirming that the projection having dimensions meeting the specification is formed for each lot. Particularly, when there is a variation in the dimensions of a number of projections formed on the circuit board and the LSI chip as the electrodes for wiring, this might cause an unfavorable electric contact, so that it is necessary to measure the height of the individual projection at a stage of quality inspection before shipping.

Herein, as the conventional method for measuring the height of such a projection, by imaging an area on the surface of the workpiece including the projection, which is an object to be measured, and performing a binary step based on brightness values in the image as obtained, the area in the image is classified into a bright area and a dark area, and by regarding the area in the image composed of the dark area as a projection area corresponding to the projection, and regarding an area composed of the bright area as a work area corresponding to the workpiece, the projection area is extracted, and the height of the projection is calculated based on the projection area.

[Patent Document 1] Japanese Patent Provisional Publication No. 2005-61953

DISCLOSURE OF THE INVENTION

Problem to be Solved by the Invention

However, even in the projection such as the bump having a conical shape, an apex of the projection is rounded, so that there is a case in which the apex of the projection looks bright by reflection of light of lighting used when obtaining the image. In this case, the apex of the projection area corresponding to the imaged projection is regarded as the bright area, so that when extracting the projection area by regarding the dark area as the projection area as described above, the area obtained by removing the apex from the projection area is regarded as the projection area. Therefore, the projection area is recognized to be smaller than the actual projection area, and as a result, there is a problem that the height of the projection is not calculated with high accuracy. Further, since the projection has a conical shape, it is difficult to evenly illuminate the same, and there is a case in which this looks brighter from the central portion to right and left sides of the projection. In this case, the portions on right and left ends of the projection area corresponding to the imaged projection are regarded as the bright areas, so that when extracting the projection area by regarding the dark area as the projection area as described above, the area obtained by removing the right and left ends from the projection area is regarded as the projection area. Therefore, the projection area is recognized to be smaller than the actual projection area, and as a result, there is a problem that the height of the projection is not calculated with high accuracy.

The present invention is achieved in view of such a problem, and an object thereof is to provide the projection height measuring method and the projection height measuring apparatus capable of measuring the height of the projection with high accuracy.

Means for Solving the Problem

In order to solve the problem, a first aspect of the invention is to provide a projection height measuring method for measuring a height of a projection having a conical shape formed on a surface of a workpiece, which comprises: an imaging step for imaging an area on the surface of the workpiece including the projection, which is an object to be measured, at an angle of depression; a projection area extracting step for extracting a projection area from an image, by classifying an area in the image into a bright area, a dark area and an intermediate area based on brightness values in the image imaged by the imaging step, and out of the bright area, the dark area and the intermediate area, regarding an area composed of the bright area and the dark area as the projection area corresponding to the projection and regarding an area composed of the intermediate area as a work area corresponding to the workpiece; a diameter/generatrix measuring step for measuring a length of a diameter corresponding portion corresponding to a bottom surface diameter portion of the projection area extracted by the projection area extracting step and a length of a generatrix corresponding portion corresponding to a generatrix portion of the projection area; and a height calculating step for calculating the height of the projection based on the length of the diameter corresponding portion, the length of the generatrix corresponding portion and the angle of depression.

According to this, even when the apex of the projection is brightly imaged by the light reflection of the lighting used when obtaining the image, the projection area may be correctly extracted by classifying the area in the obtained image into the bright area, the dark area and the intermediate area, and regarding the area in the image composed of the bright area and the dark area as the projection area and regarding the intermediate area as the work area, and thereby the height of the projection may be calculated with high accuracy.

In order to solve the problem, a second aspect of the invention is to provide the projection height measuring method according to the first aspect, wherein the projection area extracting step comprises extracting the projection area from the image, by regarding the area composed of the bright area and the dark area as the projection area corresponding to the projection and regarding the area composed of the intermediate area as the work area corresponding to the workpiece, and thereafter, performing an expansion step and a contraction step with respect to the projection area.

According to this, even when the apex of the projection is brightly imaged by the light reflection of the lighting used when obtaining the image, the projection area may be further correctly extracted by classifying the area in the obtained image into the bright area, the dark area and the intermediate area, and regarding the area in the image composed of the bright area and the dark area as the projection area and regarding the intermediate area as the work area, and thereafter, performing the expansion step and the contraction step with respect to the bright area regarded as the projection area, and thereby the height of the projection may be calculated with higher accuracy.

In order to solve the problem, a third aspect of the invention is to provide a projection height measuring method for measuring a height of a projection having a conical shape formed on a surface of a workpiece, which comprises: an imaging step for imaging a predetermined area on the surface of the workpiece including the projection, which is an object to be measured, at an angle of depression; a projection area extracting step for extracting a projection area, by classifying an area in an image into a bright area and a dark area based on brightness values in the image imaged by the imaging step, and out of the bright area and the dark area, regarding an area composed of the dark area as a projection area corresponding to the projection and regarding an area composed of the bright area as a work area corresponding to the workpiece; a diameter/generatrix measuring step for measuring a length of a diameter corresponding portion corresponding to a bottom surface diameter portion of the projection area extracted by the projection area extracting step and a length of a generatrix corresponding portion corresponding to a generatrix portion of the projection area; a storing step for storing in advance a prescribed value of the diameter corresponding portion; a judging step for judging whether the length of the diameter corresponding portion measured by the diameter/generatrix measuring step is within a predetermined range with respect to the stored prescribed value of the diameter corresponding portion; a determining step for determining the stored prescribed value of the diameter corresponding portion as a calculation value used when calculating the height of the projection when it is judged that the measured length of the diameter corresponding portion is not within the predetermined range by the judging step; and a height calculating step for calculating the height of the projection based on the calculation value determined by the determining step, the length of the generatrix corresponding portion and the angle of depression.

According to this, it is judged whether the measured length of the diameter corresponding portion is within the predetermined range with respect to the length (prescribed value) of the diameter corresponding portion stored in advance, and when it is judged that the measured length of the diameter corresponding portion is not within the predetermined range, it is determined that the length (prescribed value) of the diameter corresponding portion stored in advance is the length (calculation value) of the diameter corresponding portion used when calculating the height of the projection, thereby the optimal value may be used when calculating the height of the projection according to the measured length of the diameter corresponding portion, so that the height of the projection may be calculated with high accuracy.

In order to solve the problem, a fourth aspect of the invention is to provide a projection height measuring method for measuring a height of a projection having a conical shape formed on a surface of a workpiece, which comprises: an imaging step for imaging an area on the surface of the workpiece including the projection, which is an object to be measured, at an angle of depression; a projection area extracting step for extracting a projection area from an image, by classifying an area in the image into a bright area, a dark area and an intermediate area based on brightness values in the image imaged by the imaging step, and out of the bright area, the dark area and the intermediate area, regarding an area composed of the bright area and the dark area as the projection area corresponding to the projection and regarding an area composed of the intermediate area as a work area corresponding to the workpiece; a diameter/generatrix measuring step for measuring a length of a diameter corresponding portion corresponding to a bottom surface diameter portion of the projection area extracted by the projection area extracting step and a length of a generatrix corresponding portion corresponding to a generatrix portion of the projection area; a storing step for storing in advance a prescribed value of the diameter corresponding portion; a judging step for judging whether the length of the diameter corresponding portion measured by the diameter/generatrix measuring step is within a predetermined range with respect to the stored prescribed value of the diameter corresponding portion; a determining step for determining the stored prescribed value of the diameter corresponding portion as a calculation value used when calculating the height of the projection when it is judged that the measured length of the diameter corresponding portion is not within the predetermined range by the judging step; and a height calculating step for calculating the height of the projection based on the calculation value determined by the determining step, the length of the generatrix corresponding portion and the angle of depression.

According to this, even when the apex of the projection is brightly imaged by the light reflection of the lighting used when obtaining the image, the projection area may be correctly extracted by classifying the area in the obtained image into the bright area, the dark area and the intermediate area, and by regarding the area in the image composed of the bright area and the dark area as the projection area and regarding the intermediate area as the work area, and thereby the height of the projection may be calculated with high accuracy.

Further, it is judged whether the measured length of the diameter corresponding portion is within the predetermined range with respect to the length (prescribed value) of the diameter corresponding portion stored in advance, and when it is judged that the measured length of the diameter corresponding portion is not within the predetermined range, the optimal value may be used when calculating the height of the projection according to the measured length of the diameter corresponding portion, by determining the length (prescribed value) of the diameter corresponding portion stored in advance as the length (calculation value) of the diameter corresponding portion used when calculating the height of the projection, so that the height of the projection may be calculated with high accuracy.

In order to solve the problem, a fifth aspect of the invention is to provide the projection height measuring method according to the third or fourth aspect, wherein the determining step comprises determining the measured length of the diameter corresponding portion as the calculation value used when calculating the height of the projection when it is judged that the measured length of the diameter corresponding portion is within the predetermined range by the judging step.

According to this, it is judged whether the measured length of the diameter corresponding portion is within the predetermined range with respect to the length (prescribed value) of the diameter corresponding portion stored in advance, and when it is judged that the measured length of the diameter corresponding portion is within the predetermined range, it is determined that the measured length of the diameter corresponding portion is the length (calculation value) of the diameter corresponding portion used when calculating the height of the projection, thereby the optimal value may be used when calculating the height of the projection according to the measured length of the diameter corresponding portion, so that the height of the projection may be calculated with high accuracy.

In order to solve the problem, a sixth aspect of the invention is to provide a projection height measuring apparatus that measures a height of a projection having a conical shape formed on a surface of a workpiece, which comprises: an imaging device configured to image an area on the surface of the workpiece including the projection, which is an object to be measured, at an angle of depression; a projection area extracting device configured to extract a projection area from an image, by classifying an area in the image into a bright area, a dark area and an intermediate area based on brightness values in the image imaged by the imaging device, and out of the bright area, the dark area and the intermediate area, regarding an area composed of the bright area and the dark area as the projection area corresponding to the projection and regarding an area composed of the intermediate area as a work area corresponding to the workpiece; a diameter/generatrix measuring device configured to measure a length of a diameter corresponding portion corresponding to a bottom surface diameter portion of the projection area extracted by the projection area extracting device and a length of a generatrix corresponding portion corresponding to a generatrix portion of the projection area; and a height calculating device configured to calculate the height of the projection based on the length of the diameter corresponding portion, the length of the generatrix corresponding portion and the angle of depression.

According to this, even when the apex of the projection is brightly imaged by the light reflection of the lighting used when obtaining the image, the projection area may be correctly extracted by classifying the area in the obtained image into the bright area, the dark area and the intermediate area, and regarding the area in the image composed of the bright area and the dark area as the projection area and regarding the intermediate area as the work area, and thereby the height of the projection may be calculated with high accuracy.

In order to solve the problem, a seventh aspect of the invention is to provide the projection height measuring apparatus according to the sixth aspect, wherein the projection area extracting device is configured to extract the projection area from the image, by regarding the area composed of the bright area and the dark area as the projection area corresponding to the projection and regarding the area composed of the intermediate area as the work area corresponding to the workpiece, and thereafter, performing an expansion step and a contraction step with respect to the projection area.

According to this, even when the apex of the projection is brightly imaged by the light reflection of the lighting used when obtaining the image, the projection area may be further correctly extracted by classifying the area in the obtained image into the bright area, the dark area and the intermediate area, and regarding the area in the image composed of the bright area and the dark area as the projection area and regarding the intermediate area as the work area, and thereafter, performing the expansion step and the contraction step with respect to the bright area regarded as the projection area, and thereby the height of the projection may be calculated with higher accuracy.

In order to solve the problem, a eighth aspect of the invention is to provide a projection height measuring apparatus that measures a height of a projection having a conical shape formed on a surface of a workpiece, which comprises: an imaging device configured to image a predetermined area on the surface of the workpiece including the projection, which is an object to be measured, at an angle of depression; a projection area extracting device configured to extract a projection area, by classifying an area in an image into a bright area and a dark area based on brightness values in the image imaged by the imaging device, and out of the bright area and the dark area, regarding an area composed of the dark area as a projection area corresponding to the projection and regarding an area composed of the bright area as a work area corresponding to the workpiece; a diameter/generatrix measuring device configured to measure a length of a diameter corresponding portion corresponding to a bottom surface diameter portion of the projection area extracted by the projection area extracting device and a length of a generatrix corresponding portion corresponding to a generatrix portion of the projection area; a storing device configured to store in advance a prescribed value of the diameter corresponding portion; a judging device configured to judge whether the length of the diameter corresponding portion measured by the diameter/generatrix measuring device is within a predetermined range with respect to the prescribed value of the diameter corresponding portion stored in the storing device; a determining device configured to determine the prescribed value of the diameter corresponding portion stored in the storing device as a calculation value used when calculating the height of the projection when it is judged that the measured length of the diameter corresponding portion is not within the predetermined range by the judging device; and a height calculating device configured to calculate the height of the projection based on the calculation value determined by the determining device, the length of the generatrix corresponding portion and the angle of depression.

According to this, it is judged whether the measured length of the diameter corresponding portion is within the predetermined range with respect to the length (prescribed value) of the diameter corresponding portion stored in advance, and when it is judged that the measured length of the diameter corresponding portion is not within the predetermined range, it is determined that the length (prescribed value) of the diameter corresponding portion stored in advance is the length (calculation value) of the diameter corresponding portion used when calculating the height of the projection, thereby the optimal value may be used when calculating the height of the projection according to the measured length of the diameter corresponding portion, so that the height of the projection may be calculated with high accuracy.

In order to solve the problem, a ninth aspect of the invention is to provide a projection height measuring apparatus that measures a height of a projection having a conical shape formed on a surface of a workpiece, which comprises: an imaging device configured to image an area on the surface of the workpiece including the projection, which is an object to be measured, at an angle of depression; a projection area extracting device configured to extract a projection area from an image, by classifying an area in the image into a bright area, a dark area and an intermediate area based on brightness values in the image imaged by the imaging device, and out of the bright area, the dark area and the intermediate area, regarding an area composed of the bright area and the dark area as the projection area corresponding to the projection and regarding an area composed of the intermediate area as a work area corresponding to the workpiece; a diameter/generatrix measuring device configured to measure a length of a diameter corresponding portion corresponding to a bottom surface diameter portion of the projection area extracted by the projection area extracting device and a length of a generatrix corresponding portion corresponding to a generatrix portion of the projection area; a storing device configured to store in advance a prescribed value of the diameter corresponding portion; a judging device configured to judge whether the length of the diameter corresponding portion measured by the diameter/generatrix measuring device is within a predetermined range with respect to the prescribed value of the diameter corresponding portion stored in the storing device; a determining device configured to determine the prescribed value of the diameter corresponding portion stored in the storing device as a calculation value used when calculating the height of the projection when it is judged that the measured length of the diameter corresponding portion is not within the predetermined range by the judging device; and a height calculating device configured to calculate the height of the projection based on the calculation value determined by the determining device, the length of the generatrix corresponding portion and the angle of depression.

According to this, even when the apex of the projection is brightly imaged by the light reflection of the lighting used when obtaining the image, the projection area may be correctly extracted by classifying the area in the obtained image into the bright area, the dark area and the intermediate area, and by regarding the area in the image composed of the bright area and the dark area as the projection area and regarding the intermediate area as the work area, and thereby the height of the projection may be calculated with high accuracy.

Further, it is judged whether the measured length of the diameter corresponding portion is within the predetermined range with respect to the length (prescribed value) of the diameter corresponding portion stored in advance, and when it is judged that the measured length of the diameter corresponding portion is not within the predetermined range, the optimal value may be used when calculating the height of the projection according to the measured length of the diameter corresponding portion, by determining the length (prescribed value) of the diameter corresponding portion stored in advance as the length (calculation value) of the diameter corresponding portion used when calculating the height of the projection, so that the height of the projection may be calculated with high accuracy.

In order to solve the problem, a tenth aspect of the invention is to provide the projection height measuring apparatus according to the eighth or ninth aspect, wherein the determining device is configured to determine the measured length of the diameter corresponding portion as the calculation value used when calculating the height of the projection when it is judged that the measured length of the diameter corresponding portion is within the predetermined range by the judging device.

According to this, it is judged whether the measured length of the diameter corresponding portion is within the predetermined range with respect to the length (prescribed value) of the diameter corresponding portion stored in advance, and when it is judged that the measured length of the diameter corresponding portion is within the predetermined range, it is determined that the measured length of the diameter corresponding portion is the length (calculation value) of the diameter corresponding portion used when calculating the height of the projection, thereby the optimal value may be used when calculating the height of the projection according to the measured length of the diameter corresponding portion, so that the height of the projection may be calculated with high accuracy.

Effect of the Invention

According to the present invention, even when the apex of the projection is brightly imaged by the light reflection of the lighting used when obtaining the image, the projection area may be correctly extracted by classifying the area in the obtained image into the bright area, the dark area and the intermediate area, and regarding the area in the image composed of the bright area and the dark area as the projection area and regarding the intermediate area as the work area, and thereby the height of the projection may be calculated with high accuracy.

Further, it is judged whether the measured length of the diameter corresponding portion is within the predetermined range with respect to the length (prescribed value) of the diameter corresponding portion stored in advance, and when it is judged that the measured length of the diameter corresponding portion is not within the predetermined range, it is determined that the length (prescribed value) of the diameter corresponding portion stored in advance is the length (calculation value) of the diameter corresponding portion used when calculating the height of the projection, thereby the optimal value may be used when calculating the height of the projection according to the measured length of the diameter corresponding portion, so that the height of the projection may be calculated with high accuracy.

Figure 1:
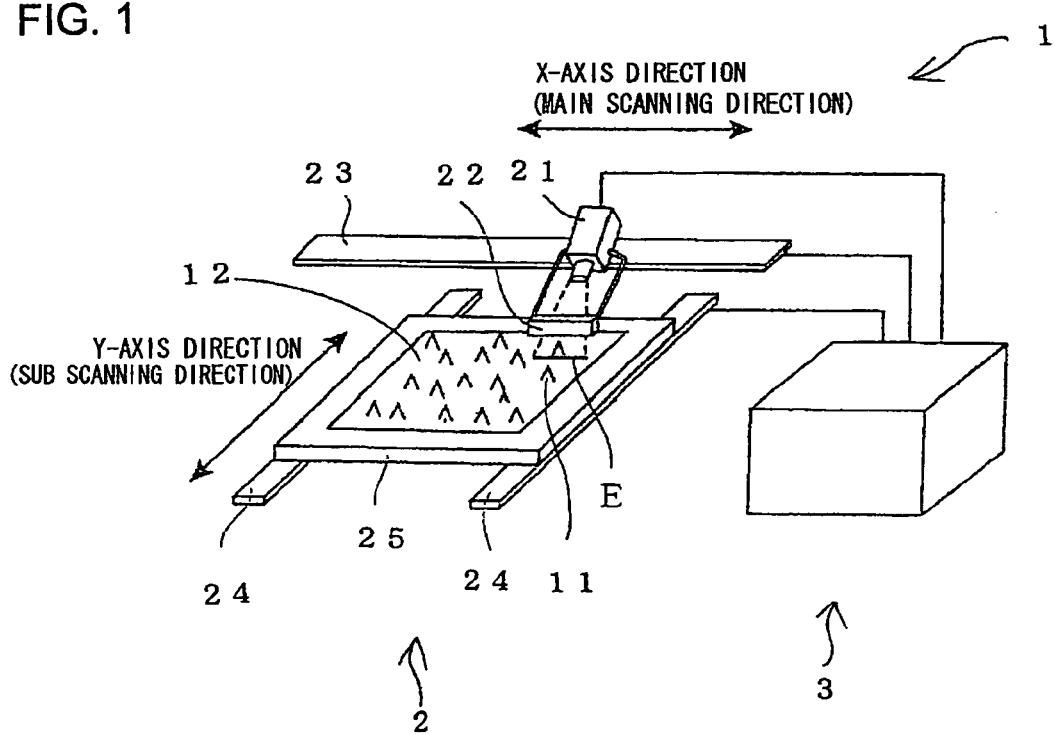
FIG. 1 is a schematic view showing a projection height measuring apparatus according to the embodiment.

DESCRIPTION OF REFERENCE NUMERALS 1 projection height measuring apparatus
2 image obtaining unit
3 control processing unit
11 projection
12 workpiece
21 camera
22 lighting
23 X-axis stage
24 Y-axis stage
25 mobile stage
31 input unit 32 display unit
33 storing unit
34 external device connecting unit
35 controlling unit
41 projection area
42 work area
43 apex of projection area
44 portion obtained by removing apex from projection area
51 generatrix corresponding portion
52 diameter corresponding portion
C1 to C3 contour
D length of diameter corresponding portion
E field of view area
h height of projection
L length of generatrix corresponding portion
P1 to P2 point on geometry
Q0 to Q4 point on projection area
r radius
θ angle of depression

BEST MODE FOR CARRYING OUT THE INVENTION

Hereinafter, the best mode of the present invention will be described with reference to the drawings.

The embodiment shows one example of a case in which a height of a projection having a conical shape formed on a surface of a workpiece is measured by a projection height measuring apparatus.

[Projection Height Measuring Apparatus]

Now, the projection height measuring apparatus according to the embodiment is schematically described with reference to FIG. 1.

FIG. 1 is a schematic view showing the projection height measuring apparatus according to the embodiment.

As shown in FIG. 1, in a projection height measuring apparatus 1 in the embodiment, an area on the surface of a workpiece 12 including a projection 11, which is an object to be measured, is imaged at an angle of depression, and an area in an image is classified into a bright area, a dark area and an intermediate area based on brightness values in the obtained image. Then, the area composed of the bright area and the dark area is regarded as a projection area corresponding to the projection 11 and an area composed of the intermediated area is regarded as a work area corresponding to the workpiece 12, and thereafter an expansion step and a contraction step are performed with respect to the projection area, and thereby the projection area is extracted from the image. Then, a length of a diameter corresponding portion corresponding to a bottom surface diameter portion of the extracted projection area and a length of a generatrix corresponding portion corresponding to a generatrix portion of the projection area are measured, and it is judged whether the measured length of the diameter corresponding portion is within a predetermined range with respect to a prescribed value of the diameter corresponding portion stored in advance. Then, when it is judged that the measured length of the diameter corresponding portion is not within the predetermined range, it is determined that the stored prescribed value of the diameter corresponding portion is a calculation value used when calculating the height of the projection, and the height of the projection is calculated based on the calculation value, the length of the generatrix corresponding portion and the angle of depression.

[Configuration and Function of Projection Height Measuring Apparatus]

Figure 2:
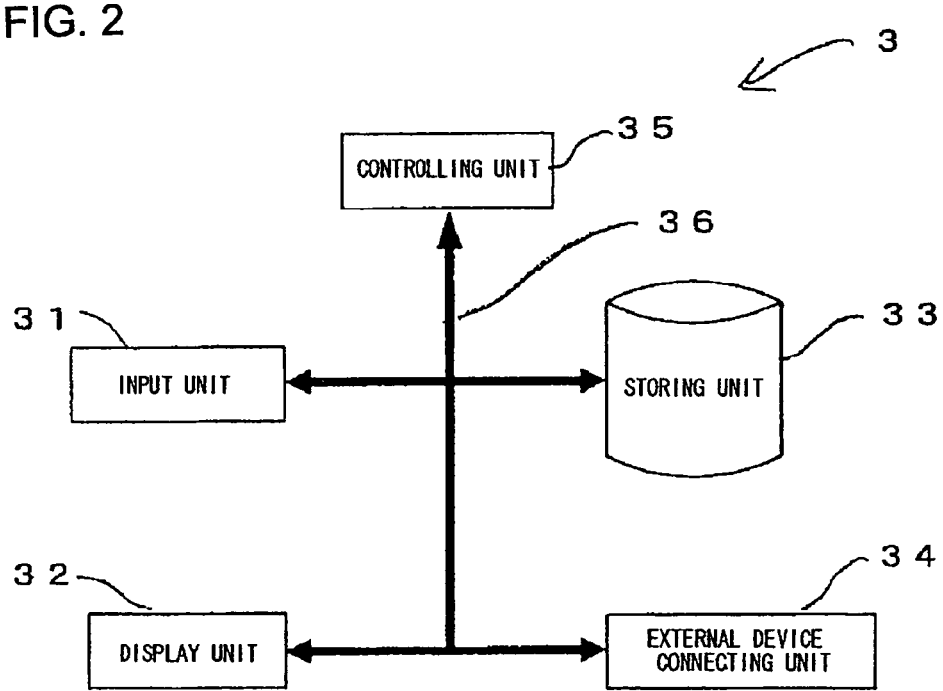
FIG. 2 is a block diagram showing a schematic configuration in a control processing unit of the projection height measuring apparatus.

Now, a configuration and a function of each unit composing the projection height measuring apparatus according to the embodiment are described with reference to FIGS. 1 and 2. FIG. 2 is a block diagram showing a schematic configuration of a control processing unit of the projection height measuring apparatus.

As shown in FIG. 1, the projection height measuring apparatus 1 is composed of an image obtaining unit 2 and a control processing unit 3.

(Image Obtaining Unit 2)

First, the image obtaining unit 2 will be described. The image obtaining unit 2 is a unit for imaging a predetermined area on the surface of the workpiece 12 including the projection 11, which is the object to be measured.

The image obtaining unit 2 is composed of a camera 21, a lighting 22, an X-axis stage 23, a Y-axis stage 24 and a mobile stage 25.

The camera 21 acts as an imaging device that images the predetermined area on the surface of the workpiece 12. Although the camera 21 is not especially limited to a specific camera and an area sensor camera, a line sensor and the like may be used. A case in which a line sensor camera is used will be described in the embodiment hereinafter. Herein, an imaging of the camera 21 is directed obliquely downward as indicated by a broken line in the drawing, and a field of view of the camera 21 is set as a field of view area E. The field of view area E is the area imaged at an angle of depression θ while illuminated by the lighting 22 placed on an upper portion.

The lighting 22 is for illuminating the field of view area E when imaging the predetermined area on the surface of the workpiece 12 including the projection 11, which is the object to be measured, with the camera 21. This moves with the camera 21, and is placed so as to always illuminate the field of view area E. As the lighting 22, a line lighting, a ring lighting, a dome lighting, and the like may be used, for example, and there is desirably used the lighting in which a shadow of the projection 11 is not easily made and a clear contrast between the surface of the workpiece 12 and the projection 11 is provided.

The X-axis stage 23, the Y-axis stage 24 and the mobile stage 25 are to move the positions of the camera 21 and the workpiece 12 when imaging the predetermined area on the surface of the workpiece 12 including the projection 11, which is the object to be measured, with the camera 21. Specifically, the X-axis stage 23 is for moving the camera 21 in an X-axis direction (main scanning direction) in the drawing, and the Y-axis stage 24 is for moving the mobile stage 25 in a Y-axis direction (sub scanning direction) in the drawing. By shifting the positions of the camera 21 and the workpiece 12 with the X-axis stage 23 and the Y-axis stage 24, respectively, the field of view area E may be moved to an entire area of the workpiece 12, and it becomes possible to image an entire surface of the workpiece with the camera 21.

(Control Processing Unit 3)

Now, the control processing unit 3 will be described. The control processing unit 3 is a unit for managing an operation of the image obtaining unit 2, and for calculating the height of the projection 11 with the image obtained by the image obtaining unit 2.

The control processing unit 3 is composed of an input unit 31, a display unit 32, a storage unit 33 as a storing device, an external device connecting unit 34, and a controlling unit as a projection area extracting device, a diameter/generatrix measuring device, a judging device, a determining device and a height calculating device, as shown in FIG. 2.

The input unit 31 includes various operation keys or the like such as number keys provided on a keyboard or the like not shown, for generating input information corresponding to an operation of a case such as to store in advance the length of the diameter corresponding portion to output to the controlling unit 35.

The display unit 32 displays image information or the like obtained by the image obtaining unit 2.

The storage unit 33 acts as the storing device of a case such as to store in advance the length of the diameter corresponding portion. This cumulatively stores the information or the like to be displayed on the display unit 32 to output to the controlling unit 35 as the stored information as necessary, and when the information to be displayed is input/updated by the operation in the input unit 31, this receives the updated information as the stored information through the controlling unit 35 to store it in a designated address.

The external device connecting unit 34 is to receive communication information when receiving the information from the image obtaining unit 2 and outputting the same to the controlling unit 35 and to transmit a position alignment information to the X-axis stage 23 and the Y-axis stage 24 for shifting the position of the camera 21 when imaging the predetermined area on the surface of the workpiece 12 with the camera 21.

The controlling unit 35 acts as the projection area extracting device, the diameter/generatrix measuring device, the judging device, the determining device and the height calculating device. Specifically, this is the unit for extracting the projection area (the projection area extracting device), measuring the length of the diameter corresponding portion corresponding to the bottom surface diameter portion of the extracted projection area and the length of the generatrix corresponding portion corresponding to the generatrix portion of the projection area (the diameter/generatrix measuring device), judging whether the length of the diameter corresponding portion is within the predetermined range stored in advance (a the judging device), determining the length of the diameter corresponding portion used when calculating the height of the projection (the determining device), and calculating the height of the projection (the height calculating device). Further, this utilizes the communication information, the input information, and the stored information to generate display information to be displayed on the display unit 32 and outputs the same to the display unit 32 to perform the required display, and generates the communication information to communicate with the image obtaining unit through the external device connecting unit 34.

[Projection Height Measuring Step]

Now, a projection height measuring step in the projection height measuring apparatus will be described with reference to a flowchart shown in FIG. 3.

Figure 3:
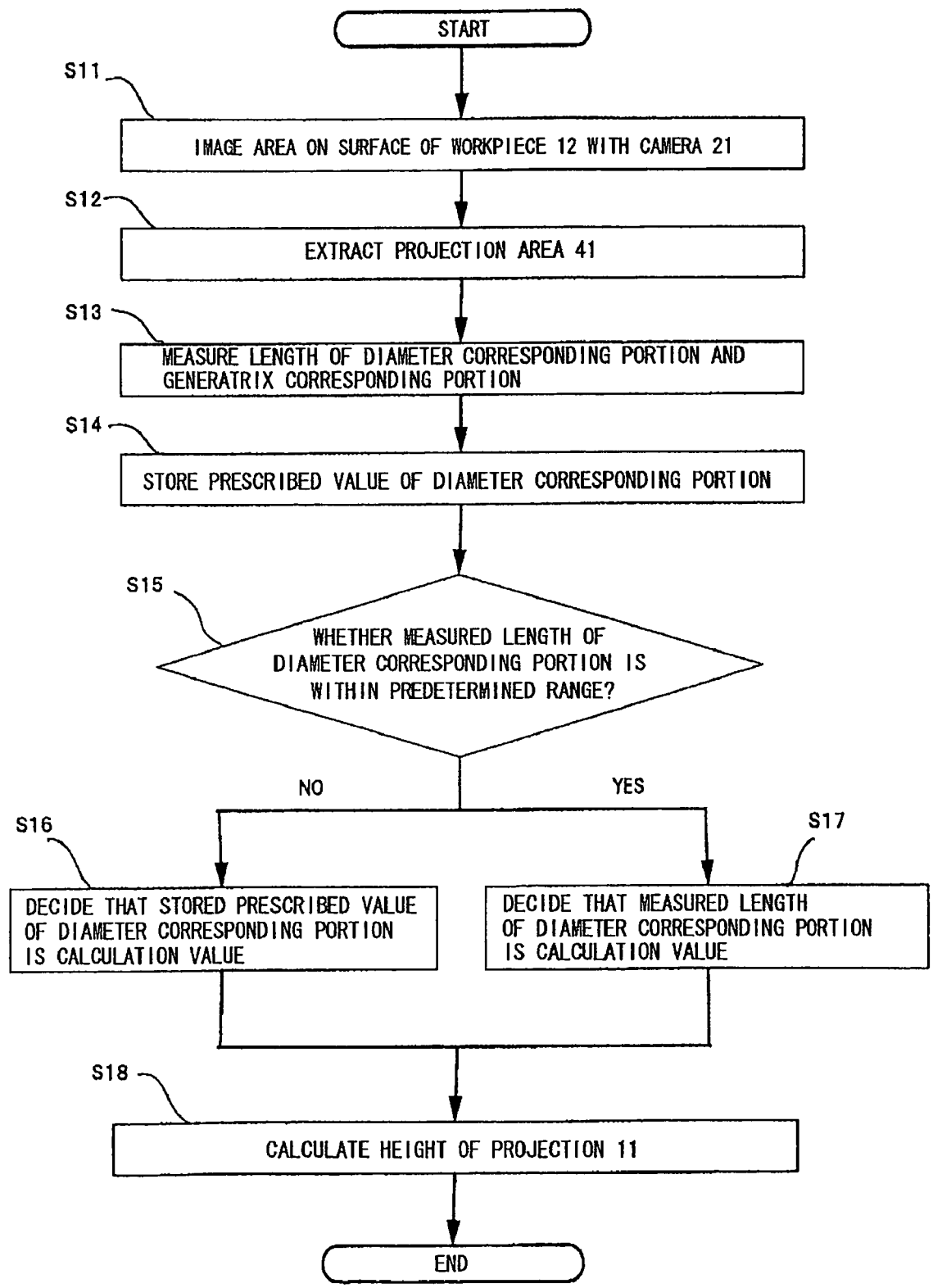
FIG. 3 is a flowchart showing a projection height measuring step in the projection height measuring apparatus.

FIG. 3 is the flowchart showing the projection height measuring step in the projection height measuring apparatus.

First, the area on the surface of the workpiece including the projection, which is the object to be measured, is imaged at the angle of depression (imaging step) (step S11).

Figure 4:
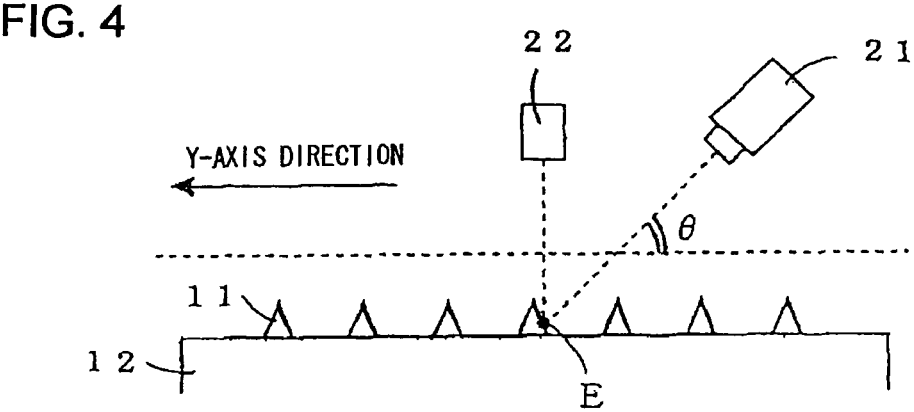
FIG. 4 is a view when imaging a predetermined area on a surface of a workpiece with a camera.

FIG. 4 is a view when imaging the predetermined area on the surface of the workpiece with the camera.

Specifically, as shown in FIG. 4, the predetermined area on the surface of the workpiece 12 is imaged at the angle of depression with the camera 21. As shown, for example, the angle of depression $\theta$ is the angle between a normal line on a central position of an imaging surface of the camera 21 and the surface of the workpiece 12.

Figure 5:
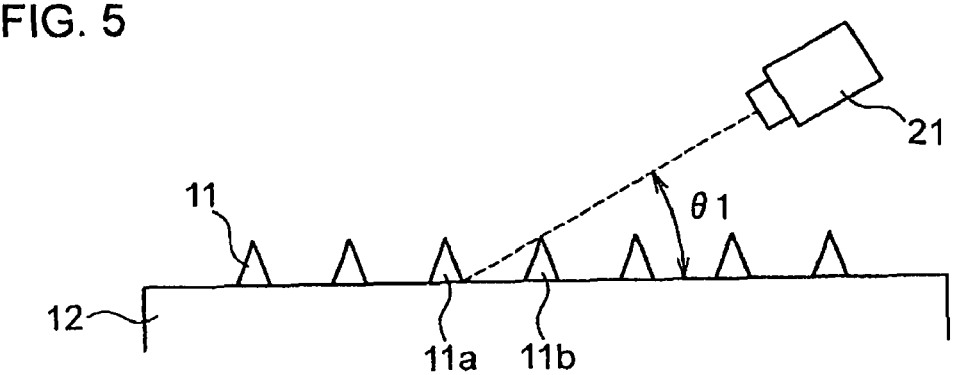
FIG. 5 is a side view showing a lower limit value.

Here, a lower limit value $\theta 1$ of the angle of depression $\theta$ is defined as a critical angle at which a plurality of projections 11 are imaged in a manner overlapped with each other when imaging a plurality of projections 11 on the surface of the workpiece 12. FIG. 5 is a side view showing the lower limit value $\theta 1$. As shown, for a pair of adjacent projections 11a and 11b, an angle between a broken line, which connects a contour position of the bottom surface of the projection 11a and an apex position of the projection 11b, and the surface of the workpiece 12 corresponds to the lower limit value $\theta 1$.

Figure 6:
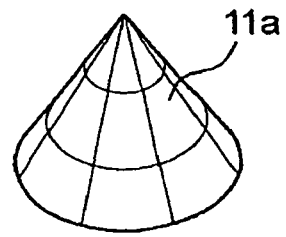
FIG. 6(a) is a view showing a projection when an angle of depression is equal to or larger than the lower limit value.
FIG. 6(b) is a view showing the projection when the angle of depression is equal to or smaller than the lower limit value.
Figure 6:
Figure 6:
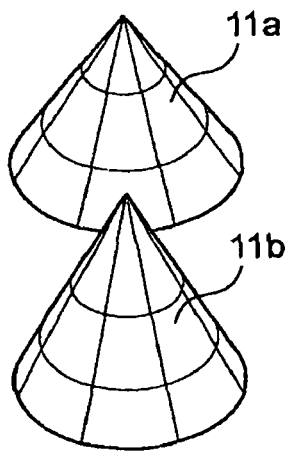

FIG. 6(a) is a view showing the projections 11a and 11b when the angle of depression $\theta$ is equal to or larger than the lower limit value $\theta 1$, and FIG. 6(b) is a view showing the projections 11a and 11b when the angle of depression $\theta$ is equal to or smaller than the lower limit value $\theta 1$. Meanwhile, vertical lines and horizontal lines in the projections 11a and 11b in FIGS. 6(a) and 6(b) are indicated so as to make the conical shape clear.

When the angle of depression $\theta$ is equal to or larger than the lower limit value $\theta 1$, the projections 11a and 11b are imaged without being overlapped with each other, as shown in FIG. 6(a). When the angle of depression $\theta$ is equal to or smaller than the lower limit value $\theta 1$, the projections 11a and 11b are imaged so as to be overlapped with each other, as shown in FIG. 6(b), so that it is not possible to recognize individual projection 11 as a separated area.

Figure 7:
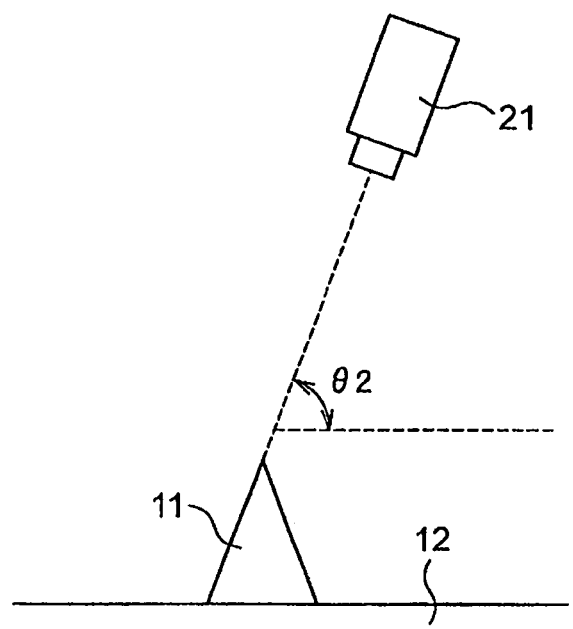
FIG. 7 is a side view showing an upper limit value.
Figure 8:
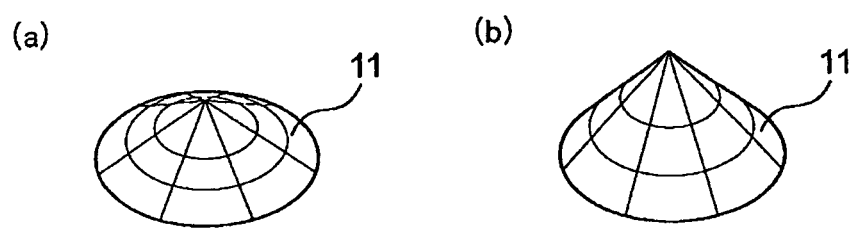
FIG. 8(a) is a view showing the projection when the angle of depression is equal to or larger than the upper limit value.
FIG. 8(b) is a view showing the projection when the angle of depression is equal to or smaller than the upper limit value.

On the other hand, supposing that the individual projection 11 is a cone, an upper limit value $\theta 2$ of the angle of depression $\theta$ is defined as the angle between the generatrix of the cone including the projection 11 and the surface of the workpiece 12. FIG. 7 is a side view showing the upper limit value $\theta 2$, FIG. 8(a) is a view showing the projection 11 when the angle of depression $\theta$ is equal to or larger than the upper limit value $\theta 2$, and FIG. 8(b) is a view showing the projection 11 when the angle of depression $\theta$ is equal to or smaller than the upper limit value $\theta 2$. Meanwhile, the vertical lines and the horizontal lines in the projections 11 in FIGS. 8(a) and 8(b) are indicated so as to make the conical shape clear.

When the angle of depression $\theta$ is equal to or larger than the upper limit value, as shown in FIG. 8(a), the apex of the projection 11 is buried inside of the projection 11, so that it is not possible to recognize a point corresponding to the apex position of the projection 11. When the angle of depression $\theta$ is equal to or smaller than the upper limit value, as shown in FIG. 8(b), the point corresponding to the apex position of the projection 11a appears on the contour of the projection 11, so that it is possible to recognize the same.

Figure 9:
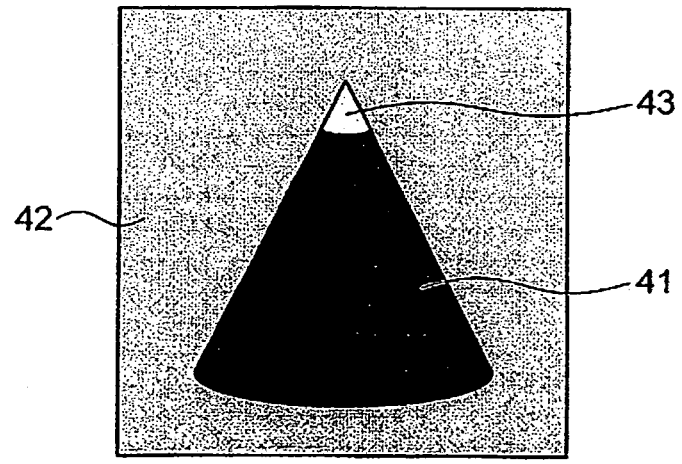
FIG. 9 is a schematic diagram showing an image imaged with a camera 21.

FIG. 9 is a schematic view showing the image imaged with the camera 21.

A projection area 41 and a work area 42 are imaged in the image obtained by imaging the predetermined area on the surface of the workpiece 12 with the camera 21. At that time, an apex 43 of the projection area is brightly imaged by reflection of light of the lighting 22 used when obtaining the image.

Then, the area in the image is classified into the bright area, the dark area and the intermediate area based on the brightness values in the obtained image, and out of the bright area, the dark area and the intermediate area, the area composed of the bright area and the dark area is regarded as the projection area corresponding to the projection, and the area composed of the intermediate area is regarded as the work area corresponding to the workpiece, and thereafter the expansion and contraction steps are performed with respect to the projection area, and thereby the projection area is extracted from the image (projection area extracting step) (step S12).

First, the area in the image is classified into the bright area, the dark area and the intermediate area based on the brightness values in the obtained image, and out of the bright area, the dark area and the intermediate area, the area composed of the bright area and the dark area is regarded as the projection area corresponding to the projection, and the area composed of the intermediate area is regarded as the work area corresponding to the workpiece (binary step).

Specifically, the binary step is performed with respect to the image shown in FIG. 9. The binary step is the step for generating histogram of the image, and giving a pixel value 1, for example, to a pixel larger than a predetermined threshold, and giving a pixel value 0, for example, to the pixel equal to or smaller than the predetermined threshold based on a size relationship with the predetermined threshold.

Figure 10:
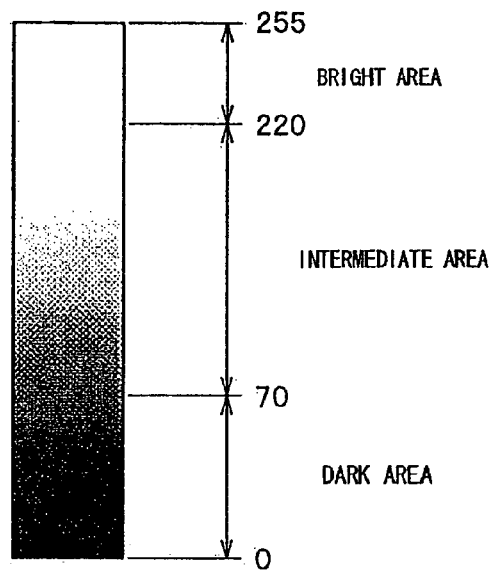
FIG. 10 is a view showing a threshold when performing a binary step.

As shown in FIG. 10, two thresholds are set as the thresholds 70 and 220, for example, when performing the binary step. Then, based on the brightness values in the image, the area in the image is classified into an area equal to or not larger than 70 (dark area), an area of 70 to 220 (intermediated area) and an area of 220 to 255 (bright area).

Figure 11:
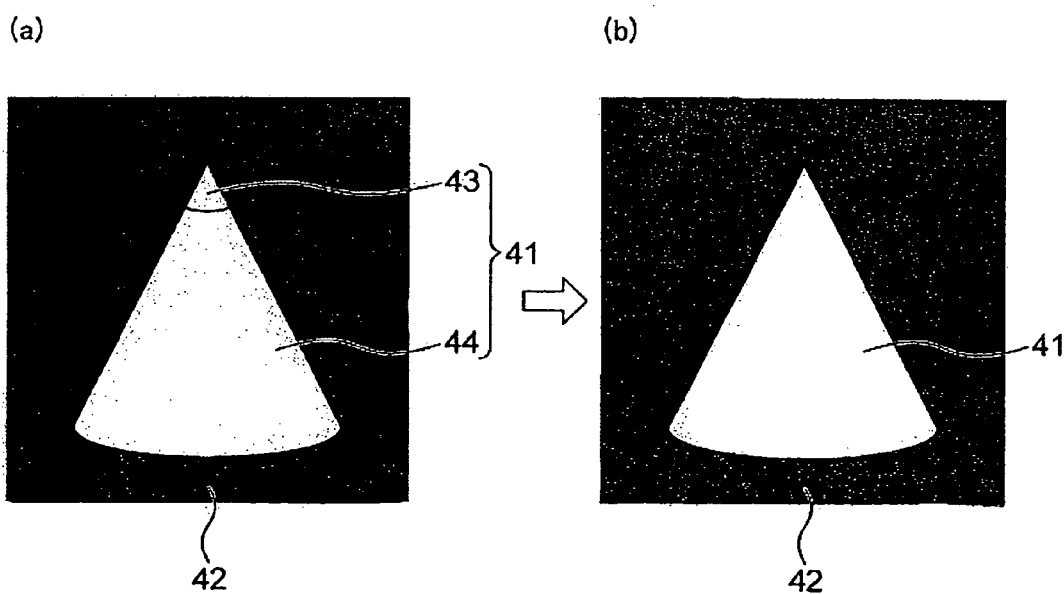
FIG. 11(a) is a schematic diagram of the image after the binary step.
FIG. 11(b) is a schematic diagram of the image after a filing step.

FIG. 11(a) is a schematic view of the image after the binary step is performed.

As described above, the area in the image is classified into the bright are (portion corresponding to the apex 43 of the projection area), the dark area (portion corresponding to a portion 44 obtained by removing the apex from the projection area) and the intermediate area (portion corresponding to the work area 42), and thereafter, the pixel value 1, for example, is given to the bright area and the dark area, and the pixel value 0 is given to the intermediate area.

In this manner, the area (the area to which the pixel value 1, for example, is given) in the image composed of the bright area (portion corresponding to the apex 43 of the projection area) and the dark area (portion corresponding to the portion 44 obtained by removing the apex from the projection area), and the area (the area to which the pixel value 0, for example, is given) in the image composed of the intermediate area (portion corresponding to the work area 42) are divided, and by regarding the area (the area to which the pixel value 1, for example, is given) in the image composed of the bright area (portion corresponding to the apex 43 of the projection area) and the dark area (portion corresponding to the portion 44 obtained by removing the apex from the projection area) as the projection area 41 and regarding the area (the area to which the pixel value 0, for example, is given) in the image composed of the intermediate area (portion corresponding to the work area 42) as the work area 42, the projection area 41 may be correctly extracted even when the apex of the projection is brightly imaged by the light reflection of the lighting used when obtaining the image, and thereby the height of the projection may be calculated with high accuracy.

Then, the projection area is extracted from the image by performing the expansion step and the contraction step (filling step) with respect to the projection area.

Specifically, the expansion step and the contraction step (filling step) are performed with respect to the projection area of the image after the binary step. By performing the expansion step and the contraction step (filling step) with respect to the projection area of the image after the binary step, a border between the bright area and the dark area is erased, and the image as shown in FIG. 1(b) is obtained. In this manner, by performing the filling step after performing the binary step, the projection area may be more correctly extracted, and thereby the height of the projection may be calculated with higher accuracy.

Next, the length of the diameter corresponding portion corresponding to the bottom surface diameter portion of the extracted projection area and the length of the generatrix corresponding portion corresponding to the generatrix portion of the projection area are measured (step S13).

Figure 12:
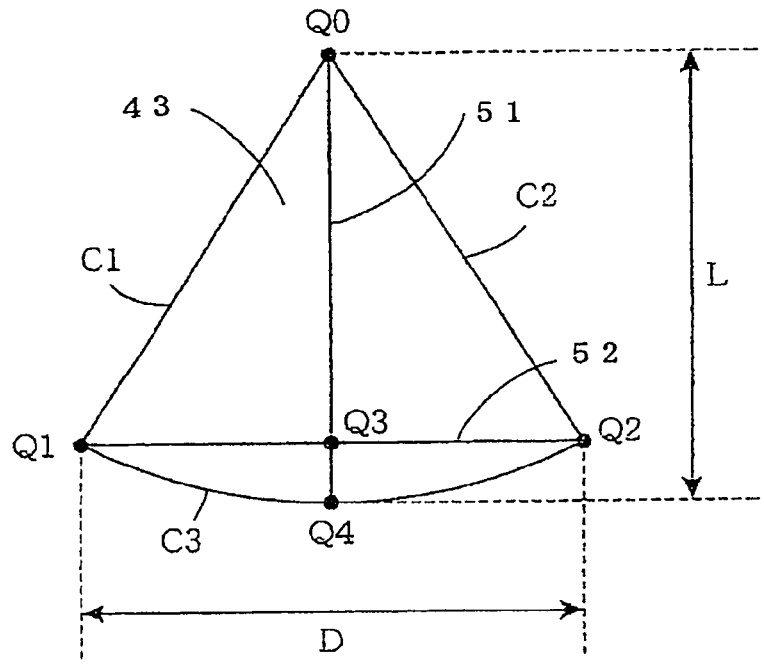
FIG. 12 is a view for illustrating a diameter corresponding portion and a generatrix corresponding portion of the projection area.

FIG. 12 is a view for illustrating the diameter corresponding portion and the generatrix corresponding portion of the projection area.

As shown in FIG. 12, three contours C1, C2 and C3 and three points Q0, Q1 and Q2 are recognized for the extracted projection area. When the projection 11, which is the object to be measured, has a conical shape, a "portion corresponding to the bottom surface diameter portion of the projection 11" of the extracted projection area is recognized as the diameter corresponding portion and a "portion corresponding to the generatrix portion of the projection" on the projection area 41 is recognized as the generatrix corresponding portion, and length D of the diameter corresponding portion and length L of the generatrix corresponding portion are measured.

When the projection 11 has a complete conical shape, the contours C1 and C2 correspond to the generatrix of the cone and the contour C3 corresponds to a circumference portion of the bottom surface of the cone. Therefore, a line segment 52 connecting the points Q1 and Q2 on the contour in the drawing is the "portion corresponding to the bottom surface diameter portion of the projection 11" (hereinafter, referred to as a diameter corresponding portion 52). Also, a line segment 51 passing through a midpoint Q3 of the line segment 52 and connecting a point Q0 and a point Q4 on the contour C3 in the drawing corresponds to the generatrix of the cone as the contours C1 and C2. That is to say, the line segment 51 connecting the points Q0 and Q4 is the "portion corresponding to the generatrix portion of the projection" (hereinafter, referred to as a generatrix corresponding portion 51).

Next, the prescribed value of the diameter corresponding portion is stored in advance (storing step) (step S14).

The length (prescribed value) of the diameter corresponding portion of the projection is set in advance, and thereafter, the length of the diameter corresponding portion used when actually calculating the height of the projection is determined based on the prescribed value of the diameter corresponding portion.

Next, it is judged whether the measured length of the diameter corresponding portion is within the predetermined range with respect to the prescribed value of the diameter corresponding portion stored in advance (judging step) (step S15).

The measured length of the diameter corresponding portion is within the predetermined range, when this is the length about ±20%, for example, of the stored prescribed value of the diameter corresponding portion.

Next, when it is judged that the measured length of the diameter corresponding portion is not within the predetermined range (step S15: NO), it is determined that the stored prescribed value of the diameter corresponding portion is the calculation value used when calculating the height of the projection (determining step) (step S16).

When it is judged that the measured length of the diameter corresponding portion is not within the predetermined range, it is not possible to judge that the measured length of the diameter corresponding portion is appropriately measured at the time of the measurement, so that the measured length of the diameter corresponding portion is not used when calculating the height of the projection, and the length (prescribed value) of the diameter corresponding portion stored in advance is used when calculating the height of the projection. Thereby, even when the diameter corresponding portion is not appropriately measured at the time of the measurement, the height of the projection may be calculated with high accuracy.

On the other hand, when it is judged that the measured length of the diameter corresponding portion is within the predetermined range (step S15: YES), it is determined that the measured length of the diameter corresponding portion is the calculation value used when calculating the height of the projection (determining step) (step S17).

When it is judged that the measured length of the diameter corresponding portion is within the predetermined range, it is possible to judge that the measured length of the diameter corresponding portion is appropriately measured at the time of the measurement, so that the measured length of the diameter corresponding portion is used when calculating. Thereby, the height of the projection may be calculated with high accuracy.

Next, the height of the projection is calculated based on the determined calculation value, the length of the generatrix corresponding portion and the angle of depression (height calculating step) (step S18).

Figure 13:
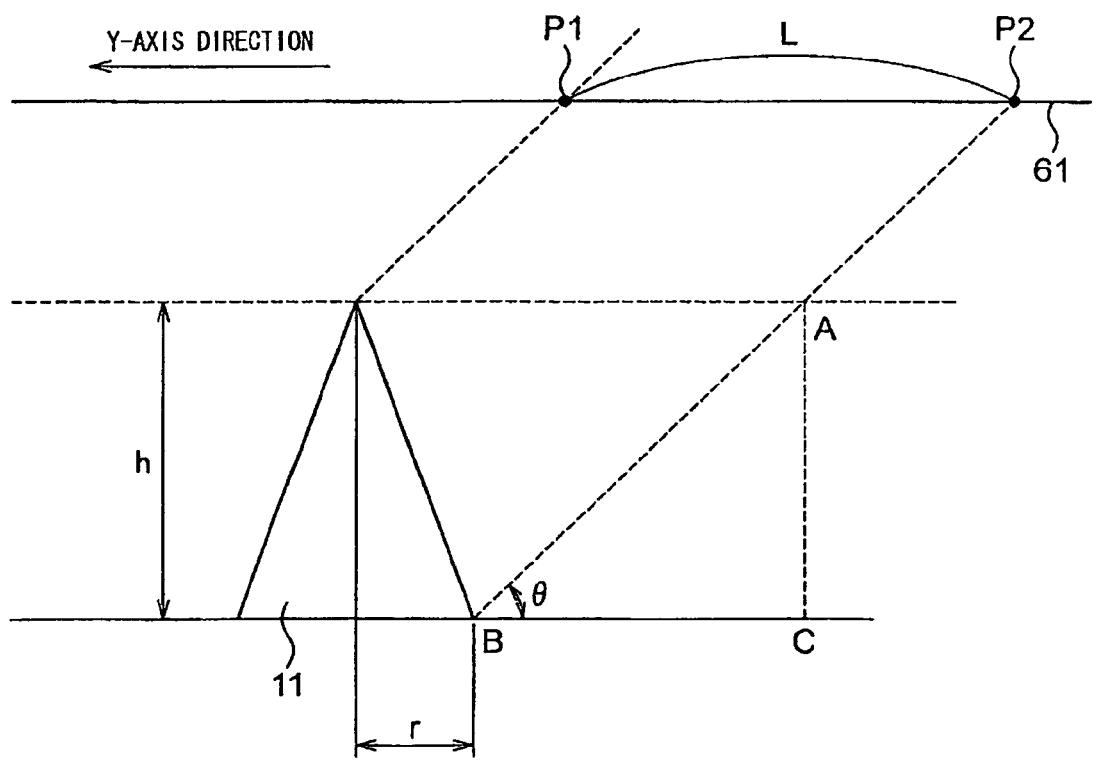
FIG. 13 is a side view showing a principle of calculation when calculating the height of the projection when imaged with the camera.

FIG. 13 is a side view showing a principle of the calculation when calculating the height of the projection when imaging with the camera.

When the camera 21 is the line sensor camera, the image obtained by scanning in the X-axis direction (direction perpendicular to a plane of paper of FIG. 13) and in the Y-axis direction with the camera 21 is a projected image on a projection surface 61 composed of a plane parallel to the surface of the workpiece 12. When the camera 21 is on a position of a point P1 in the drawing, only a vicinity of the apex of the projection 11 may be imaged, but when moving the camera 21 from the position of the point P1 to a position of a point P2 along the projection surface 61, it becomes possible to scan the projection 11 from the apex to the bottom portion thereof.

Although the length D of the diameter corresponding portion 52 shown in FIG. 12 equals to the diameter of the bottom surface of the actual projection 11, the length L of the generatrix corresponding portion 51 depends on the angle (angle of depression θ) at which the image is imaged, so that this does not equal to the length of the generatrix of the actual projection 11. Herein, as described above, the length L of the generatrix corresponding portion of the projection area 41 is distance between the points P1 and P2 on the projection surface 61 shown in FIG. 13.

Now, there will be given description of a method for calculating height h of the projection 11 based on the length (calculation value) D of the diameter corresponding portion, the length L of the generatrix corresponding portion and the angle of depression θ.

Herein, as shown in FIG. 13, given a triangle ABC, when AC=h and a radius of a circle composing the bottom surface of the actual projection 11 is r, BC=L−r, and AC=BC tan θ, so that an equation h=(L−r)tan θ is obtained. By this equation, the height h of the projection 11 may be calculated. Therefore, the height of the projection is calculated by substituting the length (calculation value) of the diameter corresponding portion, the length of the generatrix corresponding portion and the angle of depression θ into the equation.

As described above, even when the apex of the projection is brightly imaged by the light reflection of the lighting used when obtaining the image, by classifying the area in the obtained image into the bright area, the dark area and the intermediate area, and by regarding the area in the image composed of the bright area and the dark area as the projection area and regarding the intermediate area as the work area, and thereafter, by performing the expansion step and the contraction step with respect to the bright area, which is regarded as the projection area, the projection area may be correctly extracted, and thereby the height of the projection may be calculated with high accuracy.

Further, when it is judged whether the measured length of the diameter corresponding potion is within the predetermined range with respect to the length (prescribed value) of the diameter corresponding portion stored in advance, and when it is judged that the measured length of the diameter corresponding portion is not within the predetermined range, by determining the length (prescribed value) of the diameter corresponding portion stored in advance as the length (calculation value) of the diameter corresponding portion used when calculating the height of the projection, an optimal value may be used when calculating the height of the projection according to the measured length of the diameter corresponding portion, so that the height of the projection may be calculated with high accuracy.

Meanwhile, although the embodiment is based on an assumption that the projection, which is the object to be measured, has a conical shape, this is not necessarily limited to the measurement of the projection having the conical shape. When the shape of the projection is a square pyramid, for example, the method completely identical to that described above is applicable when imaging the square pyramid from a front direction thereof. Also, as for a spherical projection, the measuring method of the present invention is applicable if a certain error is allowed. In this case also, the height h may be obtained using the equation by setting a maximum width in the horizontal direction and a maximum width in the vertical direction of the projection area to D and L, respectively.

The invention claimed is:

1. A projection height measuring method for measuring a height of a projection having a conical shape formed on a surface of a workpiece, comprising:
    an imaging step for imaging, by a processing unit, an area on the surface of the workpiece including the projection, which is an object to be measured, at an angle of depression;
    a projection area extracting step for extracting, by the processing unit, a projection area from an image, by classifying an area in the image into a bright area, a dark area and an intermediate area based on brightness values in the image imaged by the imaging step, and out of the bright area, the dark area and the intermediate area, regarding an area composed of the bright area and the dark area as the projection area corresponding to the projection and regarding an area composed of the intermediate area as a work area corresponding to the workpiece;
    a diameter/generatrix measuring step for measuring, by the processing unit, a length of a diameter corresponding portion corresponding to a bottom surface diameter portion of the projection area extracted by the projection area extracting step and a length of a generatrix corresponding portion corresponding to a generatrix portion of the projection area; and
    a height calculating step for calculating, by the processing unit, the height of the projection based on the length of the diameter corresponding portion, the length of the generatrix corresponding portion and the angle of depression.

2. The projection height measuring method according to claim 1, wherein
    the projection area extracting step comprises extracting the projection area from the image, by regarding the area composed of the bright area and the dark area as the projection area corresponding to the projection and regarding the area composed of the intermediate area as the work area corresponding to the workpiece, and thereafter, performing an expansion step and a contraction step with respect to the projection area.

3. A projection height measuring method for measuring a height of a projection having a conical shape formed on a surface of a workpiece, comprising:
- an imaging step for imaging, by a processing unit, an area on the surface of the workpiece including the projection, which is an object to be measured, at an angle of depression;
- a projection area extracting step for extracting, by the processing unit, a projection area from an image, by classifying an area in the image into a bright area, a dark area and an intermediate area based on brightness values in the image imaged by the imaging step, and out of the bright area, the dark area and the intermediate area, regarding an area composed of the bright area and the dark area as the projection area corresponding to the projection and regarding an area composed of the intermediate area as a work area corresponding to the workpiece;
- a diameter/generatrix measuring step for measuring, by the processing unit, a length of a diameter corresponding portion corresponding to a bottom surface diameter portion of the projection area extracted by the projection area extracting step and a length of a generatrix corresponding portion corresponding to a generatrix portion of the projection area;
- a storing step for storing, by the processing unit, in advance a prescribed value of the diameter corresponding portion;
- a judging step for judging, by the processing unit, whether the length of the diameter corresponding portion measured by the diameter/generatrix measuring step is within a predetermined range with respect to the stored prescribed value of the diameter corresponding portion;
- a determining step for determining, by the processing unit, the stored prescribed value of the diameter corresponding portion as a calculation value used when calculating the height of the projection when it is judged that the measured length of the diameter corresponding portion is not within the predetermined range by the judging step; and
- a height calculating step for calculating, by the processing unit, the height of the projection based on the calculation value determined by the determining step, the length of the generatrix corresponding portion and the angle of depression.

4. The projection height measuring method according to claim 3, wherein the determining step comprises determining the measured length of the diameter corresponding portion as the calculation value used when calculating the height of the projection when it is judged that the measured length of the diameter corresponding portion is within the predetermined range by the judging step.

5. A projection height measuring apparatus that measures a height of a projection having a conical shape formed on a surface of a workpiece, comprising:
- an imaging device configured to image an area on the surface of the workpiece including the projection, which is an object to be measured, at an angle of depression;
- a projection area extracting device configured to extract a projection area from an image, by classifying an area in the image into a bright area, a dark area and an intermediate area based on brightness values in the image imaged by the imaging device, and out of the bright area, the dark area and the intermediate area, regarding an area composed of the bright area and the dark area as the projection area corresponding to the projection and regarding an area composed of the intermediate area as a work area corresponding to the workpiece;
- a diameter/generatrix measuring device configured to measure a length of a diameter corresponding portion corresponding to a bottom surface diameter portion of the projection area extracted by the projection area extracting device and a length of a generatrix corresponding portion corresponding to a generatrix portion of the projection area; and
- a height calculating device configured to calculate the height of the projection based on the length of the diameter corresponding portion, the length of the generatrix corresponding portion and the angle of depression.

6. The projection height measuring apparatus according to claim 5, wherein
the projection area extracting device is configured to extract the projection area from the image, by regarding the area composed of the bright area and the dark area as the projection area corresponding to the projection and regarding the area composed of the intermediate area as the work area corresponding to the workpiece, and thereafter, performing an expansion step and a contraction step with respect to the projection area.

7. A projection height measuring apparatus that measures a height of a projection having a conical shape formed on a surface of a workpiece, comprising:
- an imaging device configured to image an area on the surface of the workpiece including the projection, which is an object to be measured, at an angle of depression;
- a projection area extracting device configured to extract a projection area from an image, by classifying an area in the image into a bright area, a dark area and an intermediate area based on brightness values in the image imaged by the imaging device, and out of the bright area, the dark area and the intermediate area, regarding an area composed of the bright area and the dark area as the projection area corresponding to the projection and regarding an area composed of the intermediate area as a work area corresponding to the workpiece;
- a diameter/generatrix measuring device configured to measure a length of a diameter corresponding portion corresponding to a bottom surface diameter portion of the projection area extracted by the projection area extracting device and a length of a generatrix corresponding portion corresponding to a generatrix portion of the projection area;
- a storing device configured to store in advance a prescribed value of the diameter corresponding portion;
- a judging device configured to judge whether the length of the diameter corresponding portion measured by the diameter/generatrix measuring device is within a predetermined range with respect to the prescribed value of the diameter corresponding portion stored in the storing device;
- a determining device configured to determine the prescribed value of the diameter corresponding portion stored in the storing device as a calculation value used when calculating the height of the projection when it is judged that the measured length of the diameter corresponding portion is not within the predetermined range by the judging device; and
- a height calculating device configured to calculate the height of the projection based on the calculation value determined by the determining device, the length of the generatrix corresponding portion and the angle of depression.

8. The projection height measuring apparatus according to claim 7, wherein
the determining device is configured to determine the measured length of the diameter corresponding portion as the calculation value used when calculating the height of the projection when it is judged that the measured length of the diameter corresponding portion is within the predetermined range by the judging device.

9. The projection height measuring apparatus according to any one of claims 5, 6, and 7, further comprising a computer program product including a non-transitory computer readable medium, the computer readable medium comprising instructions that cause a computer to function as one or more of the imaging device, the projection area extracting device, the diameter/generatrix measuring device, and the height calculating device.

* * * * *